(12) United States Patent
Van Zyl

(10) Patent No.: US 10,591,380 B2
(45) Date of Patent: Mar. 17, 2020

(54) PIPE LEAK MEASUREMENT AND ASSESSMENT

(71) Applicant: University of Cape Town, Cape Town (ZA)

(72) Inventor: Jakobus Ernst Van Zyl, Fish Hoek (ZA)

(73) Assignee: University of Cape Town, Cape Town (ZA)

( * ) Notice: Subject to any disclaimer, the term of this patent is extended or adjusted under 35 U.S.C. 154(b) by 0 days.

(21) Appl. No.: 16/342,162

(22) PCT Filed: Oct. 17, 2017

(86) PCT No.: PCT/IB2017/056420
§ 371 (c)(1),
(2) Date: Apr. 15, 2019

(87) PCT Pub. No.: WO2018/073728
PCT Pub. Date: Apr. 26, 2018

(65) Prior Publication Data
US 2019/0234827 A1 Aug. 1, 2019

(30) Foreign Application Priority Data
Oct. 17, 2016 (GB) .................................. 1617573.9

(51) Int. Cl.
*G01M 3/28* (2006.01)
*E03B 7/00* (2006.01)
*F17D 5/02* (2006.01)

(52) U.S. Cl.
CPC ........... *G01M 3/2815* (2013.01); *E03B 7/003* (2013.01)

(58) Field of Classification Search
CPC ... G01M 3/2807; G01M 3/2815; E03B 7/003; F17D 5/02
See application file for complete search history.

(56) References Cited

U.S. PATENT DOCUMENTS

| 2010/0288019 A1* | 11/2010 | Simmons | G01M 3/2892 |
|---|---|---|---|
| | | | 73/40.5 R |
| 2015/0276545 A1* | 10/2015 | Takahashi | G01M 3/243 |
| | | | 73/592 |

FOREIGN PATENT DOCUMENTS

| JP | S5827041 A | 2/1983 |
|---|---|---|
| JP | 2009192329 A | 8/2009 |

(Continued)

OTHER PUBLICATIONS

Kister, Clemens, "International Search Report" for PCT/IB2017/056420, dated Feb. 12, 2018, 3 pages.

(Continued)

*Primary Examiner* — Daniel S Larkin
*Assistant Examiner* — Anthony W Megna Fuentes
(74) *Attorney, Agent, or Firm* — Winstead PC

(57) ABSTRACT

A method of estimating characteristics of new leaks formed in an isolated section of a water distribution system supplied through a pressure reducing valve. The pressure reducing valve is used to vary the pressure in the isolated section to at least two different pressure settings during a minimum night flow period at which the measured pressure and flow rate into the system are taken at each pressure setting. The leak characteristics are estimated by subtracting an estimated user consumption from the measured flow rate in each instance. The same measurements are repeated one or more days later. The estimated leak characteristics derived on a later date are compared with those derived on an earlier date to establish a difference in the estimated leak characteristics to determine if there is a new leak or leaks in the isolated section.

5 Claims, 2 Drawing Sheets

(56) References Cited

FOREIGN PATENT DOCUMENTS

| JP | 2015169647 A | 9/2015 |
|---|---|---|
| WO | WO-2008/090359 A2 | 7/2008 |
| WO | WO-2009/132865 A1 | 11/2009 |

OTHER PUBLICATIONS

Cassa, A.M., et al., "Predicting the Head-Leakage Slope of Cracks in Pipes Subject to Elastic Deformations," Journal of Water Supply: Research and Technology—AQUA, 62 (4), 2013, pp. 214-223.

Nsanzubuhoro, Rene, et al., "Predicting the Head-Area Slopes of Circular Holes in Water Pipes," 18th Conference on Water Distribution System Analysis, WDSA 2016, six pages.

Schwaller, J., "Characterising the Pressure-Leakage Response of Pipe Networks Using the FAVAD Equation," Water Science and Technology: Water Supply, 15 (6), 2015, pp. 1373-1382.

Ssozi, E.N., "Numerical Investigation of the Influence of Viscoelastic Deformation on the Pressure-Leakage Behavior of Plastic Pipes," Journal of Hydraulic Engineering, 142 (3), 2016, nine pages.

Van Zyl, J.E., et al., "Modeling Elastically Deforming Leaks in Water Distribution Pipes," Journal of Hydraulic Engineering, 140 (2), Feb. 2014, pp. 182-189.

\* cited by examiner

PIPE LEAK MEASUREMENT AND ASSESSMENT

FIELD OF THE INVENTION

This invention relates to the measurement and assessment of leaks from discrete zones of water distribution networks that are sub-divided into such discrete zones each of which may be isolated from the rest of the network and conveniently, although not necessarily, supplied through a single point. These discrete zones are often termed district metered areas (DMAs) and will be referred to as such in this specification.

More particularly, the invention relates to the measurement and assessment of leaks from district metered areas that are supplied by way of one or more pressure reducing valves or the like.

BACKGROUND TO THE INVENTION

The sensitivity of leakage to pressure has been investigated for a number of decades, but using a scientifically inferior power equation formulation (called the N1 power leakage equation). This is an empirical equation that doesn't describe the observed results in terms of their underlying causes, but is still used almost exclusively in water loss research and practice.

Pressure management has several proven benefits, including reduced leakage rates, lower rates of pipe bursts, longer infrastructure service life and more efficient water consumption. In pressure management, a pressure reducing valve (PRV) is commonly installed at the inlet or inlets of a district metered area to reduce the water pressure in the district metered area. Pressure management is especially useful in district metered areas where the pressure rises substantially above the minimum value required for adequate service provision. Pressure management has several proven benefits, including reduced leakage rates, lower rates of pipe bursts, longer infrastructure service life and more efficient water consumption.

Real water losses (or real losses) are defined as the water that is physically lost from the water distribution system through leak openings in pipes and other distribution network components. Water consumption from distribution systems varies diurnally, with the minimum consumption typically occurring in the early morning hours. The inflow into a district metered area during the lowest consumption period is called the minimum night flow (MNF), typically between 02 h00 and 04 h00. The real losses in a district metered area are estimated by subtracting the estimated user consumption from the minimum night flow.

The flow rate through a leak opening in a pipe or network component is a function of the fluid pressure as described by the orifice equation, which is derived from the principle of conservation of energy in fluids. The orifice equation is as follows:

$$Q = C_d A \sqrt{2gh} \quad (1)$$

where Q is the flow rate through the leak; $C_d$ is the discharge coefficient; A is the leak area; and h is the fluid pressure head at the leak.

The discharge coefficient $C_d$ in Equation 1 is used to compensate for energy losses and local effects that occur at leaks. Several studies have been done to estimate the discharge coefficient for different types of openings, and a reasonable estimate can thus normally be made.

In spite of the fact that the idea of a linear relationship between pressure and leak area has been assumed by others in the past (most notably by May in 1994, but by some others long before him), the idea has not found any acceptance in practice of which applicant is aware. Whilst John May and Allan Lambert developed the fixed and variable area discharge (FAVAD) concept that relies on the linear assumption in the 1990s, they did not recommend the use of the linear relationship in practice. Instead they continued to support practitioners in using the conventional N1 power equation which is a simple empirical equation with no scientific basis. As a result, people of ordinary skill in the art invariably use the N1 equation for their analyses and predictions.

Mark Shepherd and Allan Lambert (widely considered to be the doyen of leakage management in the world) are also proponents of the N1 equation and resist applying a linear relationship concept in practice. This indicates a very strong empirical tradition that has become embedded within the leakage management industry in that people feel that the N1 concept works adequately and thus they resist suggestions to move away from it.

Applicant is not aware of any attempts to apply the idea of linear pressure-area to characterise district metered area (DMA) leakage at a practical level.

The areas of leaks are not fixed, but vary with fluid pressure. It has been established through several studies that the leak area is generally a linear function of pressure:

$$A = A_0 + mh \quad (2)$$

where A is the area of the leak at a given pressure h; $A_0$ is the initial leakage area, defined as the leak area under zero pressure conditions; and m is the head-area slope, defined as the rate at which the leak area expands with increasing pressure. The initial leakage area and head-area slope are collectively referred to as the leakage parameters.

Since the discharge coefficient is not generally known in advance, a useful approach is to lump it with the area A in Equations 1 and 2 and head-area slope m in Equation 2, with $C_d A$ called the effective leakage area and $C_d m$ the effective head-area slope.

Irrespective of the foregoing, the occurrence of new leaks in a district metered area (DMA) has not been adequately considered or addressed.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

In this specification the term minimum night flow is intended to receive a realistic interpretation as it would be understood by one of ordinary skill in the art and is the flow taken at a time when the consumption is at or near its lowest during a normal 24 hour period, but not necessarily, between the hours of 02 h00 and 04 h00, so that losses through leakage are at or near a high value in comparison to consumption within the district metered area.

In this specification the term 'leakage characteristics' refers to two properties of a leak or a group of leaks, namely its initial area and head-area slope. The initial area is the size of the leak opening under zero pressure conditions and the head-area slope is the rate at which the leak area varies in size with changes in pressure.

SUMMARY OF THE INVENTION

In accordance with this invention there is a provided a method of estimating characteristics of new leaks that have formed in an isolated section of a water distribution system that is supplied through a pressure reducing valve, the method comprising the determination or estimation of leak characteristics of the isolated section of a water distribution system during a period of minimum night flow wherein the pressure reducing valve is used to vary the pressure in the isolated section of the system to at least two different pressure settings during a minimum night flow period, measuring the pressure and flow rate into the system at each pressure setting, estimating the leakage rates by subtracting an estimated user consumption from the measured flow rates; estimating the leakage characteristics from the pressure readings and leakage estimates; repeating the same measurements one or more days later, and comparing the estimated leak characteristics derived on a later date with those derived on an earlier date to establish a difference in the estimated leak characteristics to determine if there is a new leak or leaks in the isolated section of the system.

Further features of the invention provide for comparing the estimated leakage characteristics derived on a later date with those derived on an earlier date is carried out on the basis that the extent of the difference indicates an anticipated leakage type of the new leak or leaks; for the pressure and flow rate to be measured at two or more different settings of the pressure reducing valve on each occasion; for the pressure and flow rate to be measured under substantially identical conditions on the different days; for the estimated leak characteristics to be maintained on a data base so that a series of measurements taken on different days is recorded on the data base over a period of time for future consideration and analysis; and for basic characteristics of a particular isolated section of water distribution system to be maintained on the data base so that such basic characteristics are available for consideration when interpreting the difference between estimated leak characteristics with a view to establishing a preponderance of type of new leak or leaks with such information on the system including one or more of pipe age, pipe materials, failure history, hydraulic model results (flows, pressures), measurements as to flow, pressure and water quality also being maintained on the data base to facilitate estimation as to the most likely location of a new leak or leaks that have been identified.

The leakage data is thus used to estimate the system leakage characteristics being the sum of the initial areas and head-area slopes of all the leaks in the system respectively. By subtracting the respective system leakage characteristics from those obtained in a previous test, the leakage characteristics of all the new leaks that have occurred in the system during this period are determined.

The leakage characteristics of the new leaks that have formed can be used in combination with existing information on leak characteristics to estimate the size and type of the new leaks. This allows new leaks to be found and repaired faster, resulting in better customer service, lower health risks and reduced water losses. A database of new leaks that formed can be combined with leak repair records to further improve this system and allow the development of new leaks in different type of water distribution systems to be better understood.

While the discharge coefficient can be estimated at the start of an analysis, this is not necessary as the methods described herein are equally valid using the effective leakage characteristics with the leakage coefficient estimated at the end of the analysis, if required. For simplicity sake, only the leakage characteristics (i.e. without $C_d$) are employed herein.

A more detailed description of the implementation of the invention as well as an embodiment thereof will now be described by way of example only with reference to the accompanying drawing.

DETAILED DESCRIPTION WITH REFERENCE TO THE DRAWING

Figure 1:
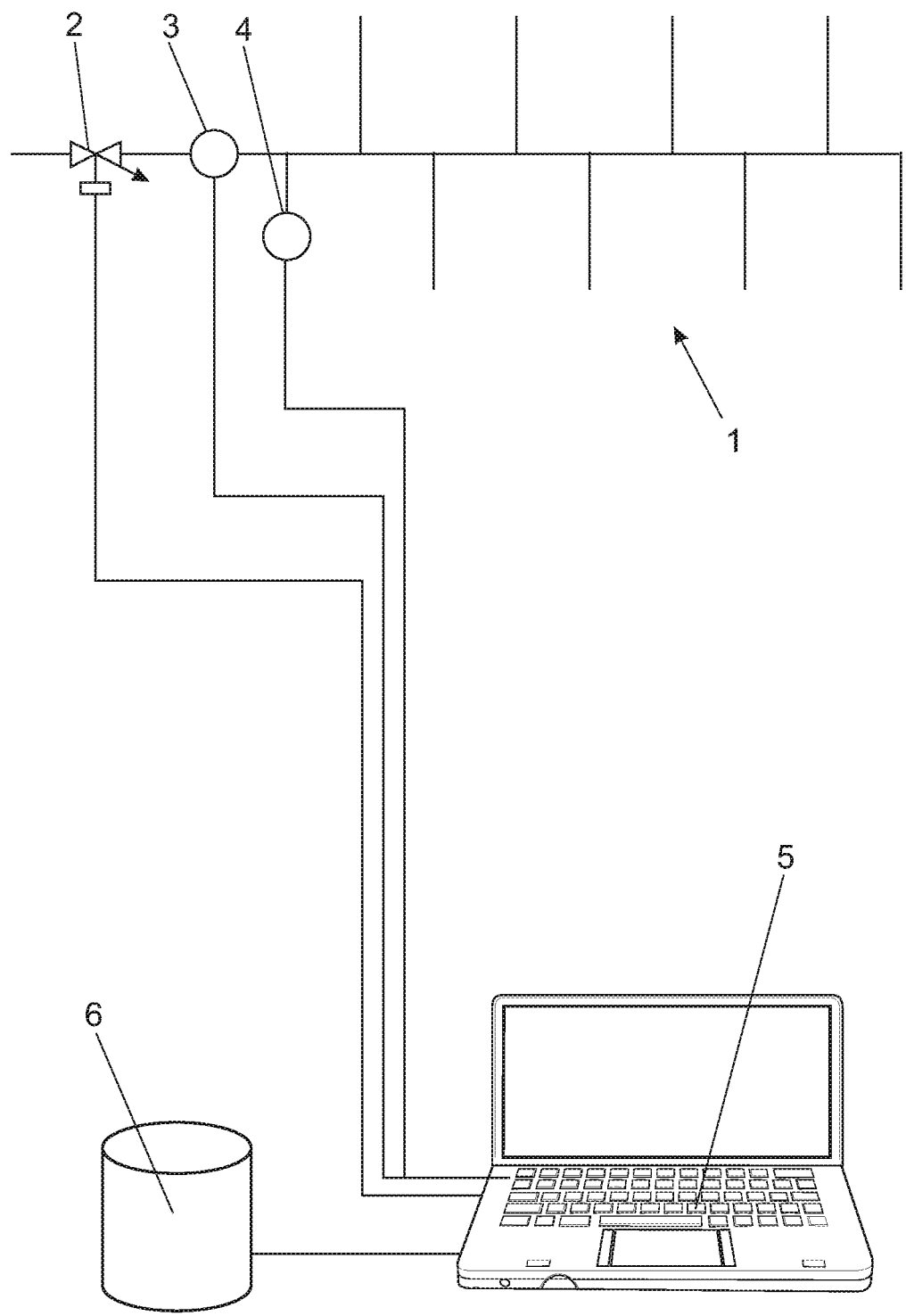
FIG. 1 is a schematic illustration of an isolated section of a water distribution system that is supplied through a pressure reducing valve and that is under examination in accordance with this invention.

The leakage flow and average zone pressure being the average pressure of all the pipes and/or consumer connections measured during minimum night flow conditions can be used with Equation 1 to estimate the total leakage area A in the system at that pressure. This pressure, leakage flow and total leakage area are called $h_1$, $Q_1$ and $A_1$ respectively.

If the pressure reducing valve (PRV) settings are changed to provide a different average zone pressure (AZP) during minimum night flow conditions, the process can be repeated to determine $h_2$, $Q_2$ and $A_2$.

The areas and average zone pressures (AZPs) determined can be used in Equation 2 to determine the system leak characteristics (initial area and head-area slope of the system). If more data points are generated as described above, the system leak characteristics can be determined with a higher level of accuracy, which is desirable.

The leakage area gives a direct physical measure of the size of the leak opening under zero pressure conditions.

The head-area slope can be used, in combination with knowledge of the properties of the pipe, to estimate the type of leak (round hole, longitudinal crack or circumferential crack) in the system and estimate its main dimension (length of crack or diameter of hole).

The type of leak may be estimated from the head-area slope through the following information based on experimental and modelling studies.

In the instance of a round hole type of leak, the head area slope range would typically be less than 0.01 mm²/m.

In the instance of a circumferential crack type of leak, the head area slope range would typically be in the range of −0.5 to 0.3 mm²/m.

In the instance of a longitudinal crack type of leak, the head area slope range would typically be a large positive value greater than 0.2 mm²/m.

The main dimension of a leak (crack length $L_C$ or hole radius r) in a pipe with known properties (internal diameter d, elasticity modulus E, wall thickness t and longitudinal stress σ) can then be estimated based on the measured head-area slope m using tables or the following equations developed by Cassa (2013) and Nsanzubuhoro (2016):

Longitudinal Cracks:

$$m_l = \frac{2.93157 \cdot d^{0.3379} \cdot L_c^{4.8} \cdot 10^{0.5997(\log L_C)^2} \cdot \rho \cdot g}{E \cdot t^{1.746}} \quad (3)$$

Circumferential Cracks:

$$m_c = \frac{1.64802 \times 10^{-5} \cdot L_c^{4.87992662} \cdot \sigma_l^{1.09182555} \cdot 10^{0.82763163(\log L_C)^2} \cdot \rho \cdot g}{E \cdot t^{0.33824224} \cdot d^{0.186376316}} \quad (4)$$

Round holes:

$$m_{eq} = 8.00\left[\left(\frac{A_0 K \rho g r}{tE}\right)(\alpha - \nu + 1 - \nu\alpha)\right] - 8 \times 10^{-9} \quad (5)$$

Note: $\rho$ is the density of the fluid, g is acceleration due to gravity, K a stress concentration factor, $\nu$ is Poisson's ratio and $\alpha$ is the ratio between circumferential and longitudinal pipe stresses.

It has been shown that the system leak characteristics (initial area and head-area slope) determined as detailed above provide good estimates of the sum of leak characteristics of the individual leaks in a district metered area (DMA) respectively (Schwaller et al, 2015).

The methods described above are in the public domain and well established in water distribution system practice.

This invention provides a technique not previously described or envisaged in that as the system leakage parameters are equal to the sum of the individual leakage parameters it follows that the difference in the system leak characteristics between two successive tests will result in the leak characteristics of any new leak or leaks that occurred between the two tests.

To implement the method of the invention, the pressure reducing valve (PRV) is programmed to determine the system leak characteristics at regular intervals (e.g. every night) and store the information in the database.

The database of leak characteristics data may be used for various purposes, such as to estimate the size and type of the new leaks based on published characteristics of tests and analysis of leak characteristics.

It could be used to determine corrective action, such as sending out leak detection teams if new leaks are large enough.

It can be used to combine the leak characteristics data with information as to the system pipes (age, pipe materials, failure history, etc.), hydraulic model results (flows, pressures, etc.), measurements (flow, pressure, water quality, etc.) and other data to carry out an estimate as to the most likely location of new leaks.

The data may also serve to enable the condition of the system to be evaluated as regards the number and types of leaks that develop over time.

A search for correlations and trends in the data in combination with other data sources may be conducted using big data techniques.

The database can be linked with other data sources, such as leak detection and repair records to provide feedback on the link between the leakage parameters determined through this method and the actual leakage parameters in the field.

Example

An isolated section of a water distribution system is indicated by the numeral (1) in FIG. 1. The isolated section is supplied through a pressure reducing valve (2) and the flow under minimum night flow conditions is monitored by a flow meter (3) whilst the pressure is monitored by a pressure gauge (4). A computer (5) controls the pressure reducing valve to provide target output pressures as may be required and a data base (6) is provided for maintaining records of the leak characteristics and any other data such as information on the system including that of pipe age, pipe materials, failure history, hydraulic model results (flows, pressures), measurements as to flow, pressure and water quality, all with a view to facilitating estimation as to the most likely location of a new leak or leaks that have been identified.

In this example of the invention the isolated section of a water distribution system indicated by the numeral (1) is isolated from the rest of the network except for a single inlet pipe that is connected to a bulk supply pipeline. The inlet pipe is fitted with the flow meter (3) and pressure reducing valve (2). The average zone pressure during the minimum night flow period in the isolated section is 40 m of water. To estimate the real losses in the isolated section, the actual consumption during the period is estimated and subtracted from the flow rate obtained from the flow meter (3).

The computer driven pressure reducing valve (2) is programmed to reduce the average zonal pressure (AZP) to 40 m and then to 30 m, in each case for long enough to allow flow and pressure measurements to stabilise during the minimum night flow period to allow the real losses at each of the pressures to be estimated.

On day 1, the real losses in the isolated section are determined as set out in the table below. Discharge coefficient $C_d$=0.7 and acceleration due to gravity g=9.81 m/s$^2$ are assumed:

|  | Values at AZP 1 | Values at AZP 2 |
| --- | --- | --- |
| Average system pressure head h (m) | 40 | 30 |
| Leakage flow rate Q (L/s) | 0.41 | 0.35 |
| Total leakage area A (mm$^2$) (from equation 1) | 20.9 | 20.6 |

The real losses and pressures in the table above are used to estimate the system leakage characteristics for day 1 using equation 2:
$A_0$=19.7 mm$^2$
m=0.03 mm$^2$/m On day 2, the exercise is repeated and the real losses in the isolated section are determined as described in the table below. Discharge coefficient $C_d$=0.7 and acceleration due to gravity g=9.81 m/s$^2$ are assumed:

|  | Values at AZP 1 ([11]) | Values at AZP 2 ([12]) |
| --- | --- | --- |
| Average system pressure head h (m) | 40 | 30 |
| Leakage flow rate Q (L/s) | 0.72 | 0.56 |
| Total leakage area A (mm$^2$) (from equation 1) | 36.7 | 33.0 |

The real losses and pressures in the table above are used to estimate the system leakage parameters for day 2 using equation 2:
$A_0$=21.9 mm$^2$ ([14])
m=0.37 mm$^2$/m It is clear that a new leak (or leaks) appeared in the isolated section between the tests on day 1 and day 2. The leakage parameters of the new leak or leaks can now be determined as follows:

$A_0 = 21.9 - 19.7 = 2.2$ mm$^2$ $m = 0.37 - 0.03 = 0.34$ mm$^2$/m

The new leak may now be identified using these values as follows:

The relatively large value of the head-area slope indicates that the new leak is most likely a longitudinal crack.

Assuming a typical pipe made from uPVC (elasticity modulus=3 GPa) with a diameter of 150 mm and wall thickness of 5 mm, the length of the crack may be estimated from Equation 3 to be approximately 100 mm.

The width of the crack under zero pressure conditions may be estimated from its initial area and the length of the crack to be 0.02 mm, i.e. the crack will virtually close fully when the pressure is removed.

This information can now be combined with existing data on pipe condition, historic pipe failures, pressure distributions, etc. to identify the most likely location of a 100 mm long longitudinal crack.

The results of the test over two days may not be highly accurate due to measurement errors, variations in night consumption and pressure fluctuations. However, if this test is repeated every night to build a database of data points and combined with feedback from the actual parameters of leaks that were found and repaired in the system, it has the potential to become an accurate and reliable diagnostic tool.

Figure 2:
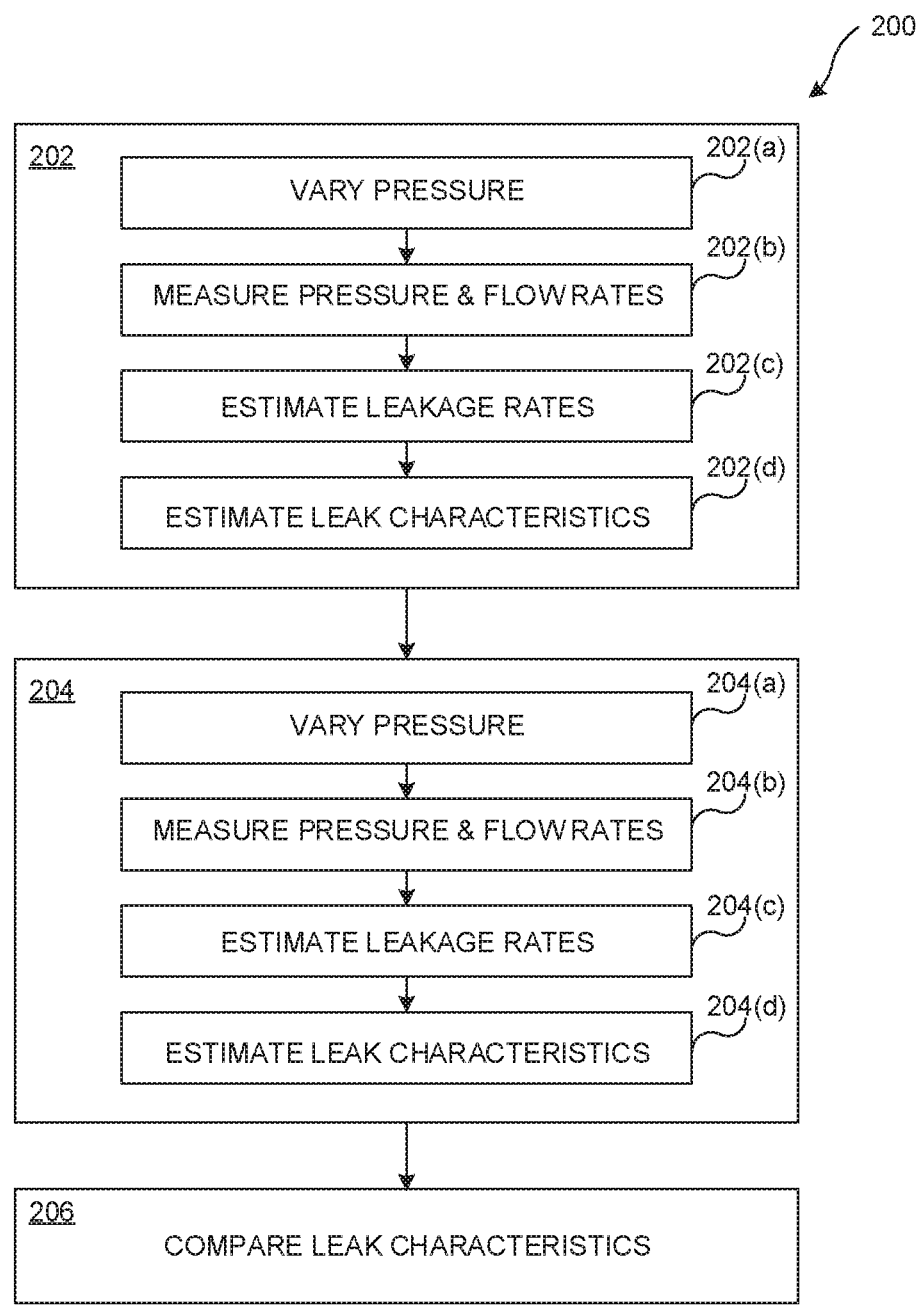
FIG. 2 illustrates a method of estimating characteristics of new leaks that have formed in the isolated section of the water distribution system shown in FIG. 1.

FIG. 2 illustrates a method 200 of estimating characteristics of new leaks that have formed in the isolated section 1 of the water distribution system of FIG. 1 that is supplied through the pressure reducing valve 2. The method 200 begins at step 202. At step 202, a determination or estimation of leak characteristics of the isolated section 1 of the water distribution system during a period of minimum night flow of a first, earlier date is performed. Step 202 includes sub-steps 202(a)-(d).

At sub-step 202(a), the pressure reducing valve 2 is used to vary the pressure in the isolated section 1 of the system to at least two different pressure settings during the minimum night flow period of the first date. At sub-step 202(b), during said period of the first date, the pressure and flow rate into the system are measured at each pressure setting. At sub-step 202(c), leakage rates for the first date are estimated by subtracting an estimated user consumption during said period of the first date from the measured flow rates of said period of the first date. At sub-step 202(d), the leak characteristics of the first date are estimated from the pressure measurement readings of sub-step 202(b) and the leakage rate estimates of sub-step 202(c).

From step 202, execution proceeds to step 204. At step 204, a determination or estimation of leak characteristics of the isolated section of the water distribution system during a period of minimum night flow of a second date which is later than the first date is performed. Step 204 includes sub-steps 204(a)-(d).

At sub-step 204(a), the pressure reducing valve 2 is used to vary the pressure in the isolated section 1 of the system to at least two different pressure settings during the period of minimum night flow of the second date. At sub-step 204(b), during said period of the second date, the pressure and flow rate into the system are measured at each pressure setting. At sub-step 204(c), leakage rates for the second date are estimated by subtracting an estimated user consumption during said period of the second date from the measured flow rates of said period of the second date. At sub-step 204(d), the leak characteristics of the second date are estimated from the pressure measurement readings of sub-step 204(b) and the leakage rate estimates of sub-step 204(c).

From sub-step 204, execution proceeds to step 206. At step 206, the estimated leak characteristics derived for the second date are compared with those derived for the first date to establish a difference in the estimated leak characteristics in order to determine whether on the second date there is a new leak or leaks in the isolated section 1 of the system. The term new leak refers to a leak that was present in the isolated section 1 of the water distribution system on the second date but not on the first date.

Comparing the estimated leak characteristics derived for the second date with those derived for the first date may be carried out on the basis that the extent of the difference in the estimated leak characteristics between the first and second dates indicates an anticipated size and leakage type of the new leak or leaks. Leakage data may be used to estimate system leakage characteristics of the water distribution system. The system leakage characteristics may be, for each of the first and second dates, a sum of the initial areas of all leaks in the system and a sum of the head-area slopes of all leaks in the system, by subtracting the system leakage characteristics derived for one of said first and second dates from those derived for the other of said first and second dates.

The estimated leak characteristics for a plurality of different sets of first and second dates may be maintained on the data base 6 so that a series of estimated leak characteristics taken on different days is recorded on the data base 6 over a period of time for future consideration and analysis. Characteristics of a particular isolated section 1 of the water distribution system may be maintained on the data base 6. The characteristics may be selected from the group consisting of pipe age, pipe materials, failure history, hydraulic model results, and measurements as to flow, pressure, and water quality, so that such characteristics are available for consideration when interpreting the difference between estimated leak characteristics with a view to establishing a preponderance of type of new leak or leaks.

REFERENCES

Cassa, A. M., Van Zyl, J. E. (2013) Predicting the pressure-leakage slope of cracks in pipes subject to elastic deformations, *Journal of Water Supply: Research and Technology—AQUA*, 62 (4) 214-223.

Schwaller, J., Van Zyl, J. E., Kabaasha, A. M. (2015) Characterising the pressure-leakage response of pipe networks using the FAVAD equation, Water Science & Technology: Water Supply, 15 (6) 1373-1382, DOI: 10.2166/ws.2015.101.

Ssozi, E. N., Reddy, B. D., Van Zyl, J. E. (2015) Numerical investigation of the influence of viscoelastic deformation on the pressure-leakage behavior of plastic pipes, *Journal of Hydraulic Engineering*, DOI: 10.1061/(ASCE)HY.1943-79000.0001095.

Van Zyl, J. E., Cassa, A. M. (2014) "Modeling elastically deforming leaks in water distribution pipes", *Journal of Hydraulic Engineering*, 140 (2) 182-189.

Throughout the specification and claims unless the contents requires otherwise the word 'comprise' or variations such as 'comprises' or 'comprising' will be understood to imply the inclusion of a stated integer or group of integers but not the exclusion of any other integer or group of integers.

The invention claimed is:

1. A method of estimating characteristics of new leaks that have formed in an isolated section of a water distribution system that is supplied through a pressure reducing valve, the method comprising:
    (i) determination or estimation of leak characteristics of a leak or leaks present in the isolated section of the water distribution system during a period of minimum night flow of a first, earlier date by performing the following steps:
        (i.i) using the pressure reducing valve to vary the pressure in the isolated section of the system to at least two different pressure settings during the minimum night flow period of the first date;
        (i.ii) measuring, during said period of the first date, pressure and flow rate into the system at each pressure setting;
        (i.iii) estimating leakage rates for the first date by subtracting an estimated user consumption during said period of the first date from the measured flow rates of said period of the first date;
        (i.iv) estimating the leak characteristics of the first date from the pressure measurement readings of step (i.ii) and the leakage rate estimates of step (i.iii);
    (ii) determination or estimation of leak characteristics of a leak or leaks present in the isolated section of the water distribution system during a period of minimum night flow of a second date which is later than the first date, by performing the following steps:
        (ii.i) using the pressure reducing valve to vary the pressure in the isolated section of the system to at least two different pressure settings during the period of minimum night flow of the second date;
        (ii.ii) measuring, during said period of the second date, pressure and flow rate into the system at each pressure setting;
        (ii.iii) estimating leakage rates for the second date by subtracting an estimated user consumption during said period of the second date from the measured flow rates of said period of the second date;
        (ii.iv) estimating the leak characteristics of the second date from the pressure measurement readings of step (ii.ii) and the leakage rate estimates of step (ii.iii); and
    (iii) comparing the estimated leak characteristics derived for the second date with those derived for the first date to establish a difference in the estimated leak characteristics, thereby to determine that on the second date there is a new leak or new leaks in the isolated section of the system, wherein a new leak or new leaks refer to a leak or leaks present in the isolated section of the water distribution system on the second date but not on the first date.

2. The method as claimed in claim 1, in which comparing the estimated leak characteristics derived for the second date with those derived for the first date is carried out on a basis that the extent of the difference in the estimated leak characteristics between the first and second dates indicates an anticipated size and leakage type of the new leak or new leaks.

3. The method as claimed in claim 1, in which leakage data is used to estimate system leakage characteristics of the water distribution system, said system leakage characteristics being, for each of the first and second dates, a sum of the initial areas of all leaks in the system and a sum of the head-area slopes of all leaks in the system, by subtracting the system leakage characteristics derived for one of said first and second dates from those derived for the other of said first and second dates.

4. The method as claimed in claim 1, in which the estimated leak characteristics for a plurality of different sets of first and second dates are maintained on a data base so that a series of estimated leak characteristics taken on different days is recorded on the data base over a period of time for future consideration and analysis.

5. The method of claim 4, in which characteristics of a particular isolated section of water distribution system are maintained on the data base, said characteristics being selected from the group consisting of pipe age, pipe materials, failure history, hydraulic model results, and measurements as to flow, pressure and water quality, so that such characteristics are available for consideration when interpreting the difference between estimated leak characteristics with a view to establishing a preponderance of type of new leaks or new leaks.

* * * * *